United States Patent [19]

Kanamaru et al.

[11] Patent Number: 4,580,779

[45] Date of Patent: Apr. 8, 1986

[54] PICTURE INFORMATION PROCESSING SYSTEM

[75] Inventors: Hitoshi Kanamaru, Tokorozawa; Tsunetaka Kusumoto, Tokyo, both of Japan

[73] Assignee: Pioneer Video Corporation, Yamanashi, Japan

[21] Appl. No.: 453,827

[22] Filed: Dec. 28, 1982

[30] Foreign Application Priority Data

Dec. 29, 1981 [JP] Japan .................................. 56-212530

[51] Int. Cl.⁴ .............................................. A63F 9/22
[52] U.S. Cl. ............................. 273/1 E; 273/DIG. 28
[58] Field of Search ............. 273/DIG. 28, 1 E, 85 G

[56] References Cited

U.S. PATENT DOCUMENTS

| | | | |
|---|---|---|---|
| 4,333,152 | 6/1982 | Best | 273/DIG. 28 |
| 4,355,814 | 10/1982 | Cope | 273/DIG. 28 |
| 4,359,223 | 11/1982 | Baer et al. | 273/DIG. 28 |
| 4,423,870 | 1/1984 | Bristow | 273/DIG. 28 |
| 4,467,412 | 8/1984 | Hoff | 273/DIG. 28 |

Primary Examiner—Richard C. Pinkham
Assistant Examiner—Leo P. Picard
Attorney, Agent, or Firm—Fleit, Jacobson, Cohn & Price

[57] ABSTRACT

A picture information processing system comprising an input for generating a play control signal in accordance with external operations (2, 3); memory for storing picture information and for producing a picture information signal (5, 9, 10); display for displaying a picture on a screen in accordance with the picture information (5, 8, 1); detector for producing a detection signal when the picture information signal has an instantaneous magnitude equal to a predetermined value (5, 11, 12); and a controller for performing a predetermined result operation, such as modification of the reproduced picture, reproduction of a score on the screen, and production of a sound, in accordance with the play control signal and the detection signal (5, 6); thereby to perform an advanced and complicated operation without increasing the steps of the program governing the system.

9 Claims, 23 Drawing Figures

Fig. 5
| R | G | B | 13a | 13b | 13c | 13d | 13e | 13f | 13g | 13h |
|---|---|---|-----|-----|-----|-----|-----|-----|-----|-----|
| 0 | 0 | 0 | 1 | 0 | 0 | 0 | 0 | 0 | 0 | 0 |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| A→ 1 | 0 | 0 | 0 | 0 | 0 | 1 | 0 | 0 | 0 | 0 |
| 1 | 1 | 0 | 0 | 0 | 0 | 0 | 1 | 0 | 0 | 0 |
| 1 | 0 | 1 | 0 | 0 | 0 | 0 | 0 | 1 | 0 | 0 |
| 0 | 1 | 1 | 0 | 0 | 0 | 0 | 0 | 0 | 1 | 0 |
| 1 | 1 | 1 | 0 | 0 | 0 | 0 | 0 | 0 | 0 | 1 |
Fig. 7
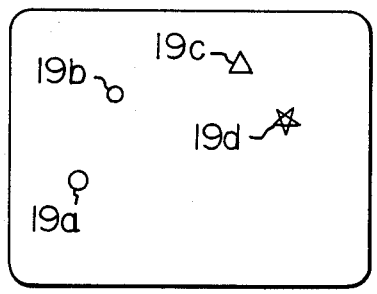
Fig. 8
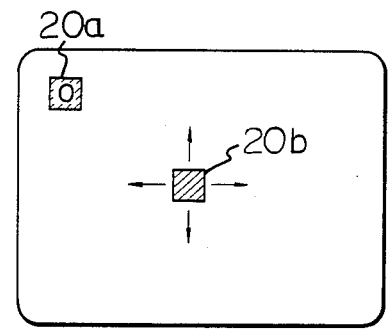

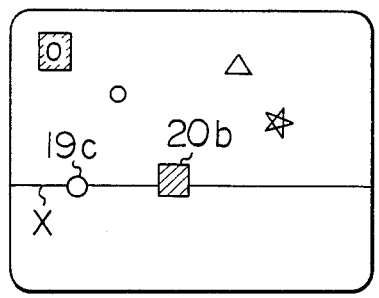
Fig. 9A
| | | |
|---|---|---|
| Fig. 9B | R |  |
| Fig. 9C | G | 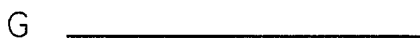 |
| Fig. 9D | B | 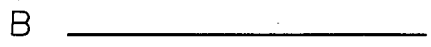 |
| Fig. 9E | ORGATE 15 | 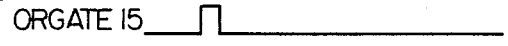 |
| Fig. 9F | TIMING SIGNAL | 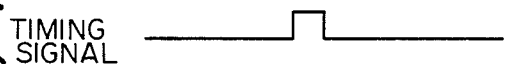 |
| Fig. 9G | |  |
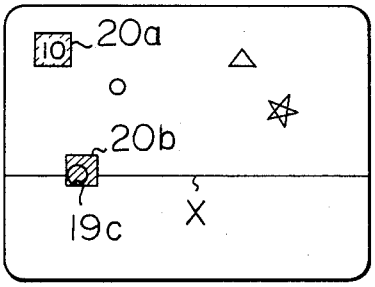
Fig. 10A
| | |
|---|---|
| Fig. 10B |  |
| Fig. 10C |  |
| Fig. 10D | 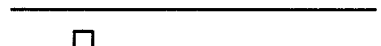 |
| Fig. 10E |  |
| Fig. 10F | 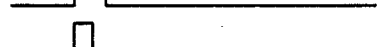 |
| Fig. 10G | 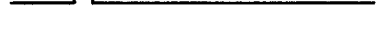 |

PICTURE INFORMATION PROCESSING SYSTEM

BACKGROUND OF THE INVENTION

1. Field of the Invention

The present invention relates to a picture information processing system, and more specifically to a system for processing picture signals including a signal generated by a computing device such as a microprocessor and for displaying a processed signal in a display device such as a video screen.

2. Description of the Prior Art

In a video game system or in an audio-visual education system, a microprocessor is generally utilized to produce a picture information which is to be displayed in a display device such as a cathode-ray tube (CRT) of a monitor device or a television set.

More specifically, such a picture information is produced by the microprocessor which executes a program stored in a read only memory (ROM) in response to input information from various sources such as a keyboard or a game control.

However, this type of system which has only an internal memory device had a drawback that it cannot execute a highly advanced program processing relatively complicated picture information due to a limited capacity of the internal memory and a low processing speed of the microprocessor.

Therefore, an improved system has been proposed in which an external memory device such as a magnetic disc unit, a video tape recorder (VTR) or a video disc player (VDP) is used for increasing the capacity of the total memory.

In this improved system, however, an improvement is required to increase the processing speed of the system so as to perform much more complicated games.

SUMMARY OF THE INVENTION

An object of the present invention is therefore to provide a picture information processing system which can perform an advanced function without increasing the space of the internal and/or the external memory device and can perform relatively complicated game with complicated pictures.

To this end, the present invention contemplates a picture information processing system comprising: (a) input means for generating a play control signal in accordance with external operations; (b) memory means for storing picture information and for producing a picture information signal; (c) display means for displaying a picture in accordance with said picture information signal; (d) detecting means for producing a detection signal when said picture information signal has an instantaneous magnitude equal to a predetermined value; and (e) control means for performing a predetermined result operation in accordance with said play control signal and said detection signal.

The foregoing and other objects and advantages of the present invention will become more clearly understood upon review of the following description taken in conjunction with the accompanying drawings.

BRIEF DESCRIPTION OF THE DRAWINGS

FIG. 5 is a truth table showing the operation of the AND gates of the detector shown in FIG. 4;

FIG. 7 is a picture illustrating an example of the image produced on the video screen using picture data from an external memory device;

FIG. 8 is a picture illustrating an example of the image produced on the video screen using picture data generated by the microprocessor unit;

FIGS. 9A through 9G are diagrams illustrating the operation of the detector of FIG. 3, especially illustrating waveforms of various parts of the detector;

FIGS. 10A through 10G are diagrams illustrating the operation of the detector of FIG. 3, especially illustrating waveforms of various parts of the detector during the detection operation thereof.

DETAILED DESCRIPTION OF THE PREFERRED EMBODIMENT

Figure 1:
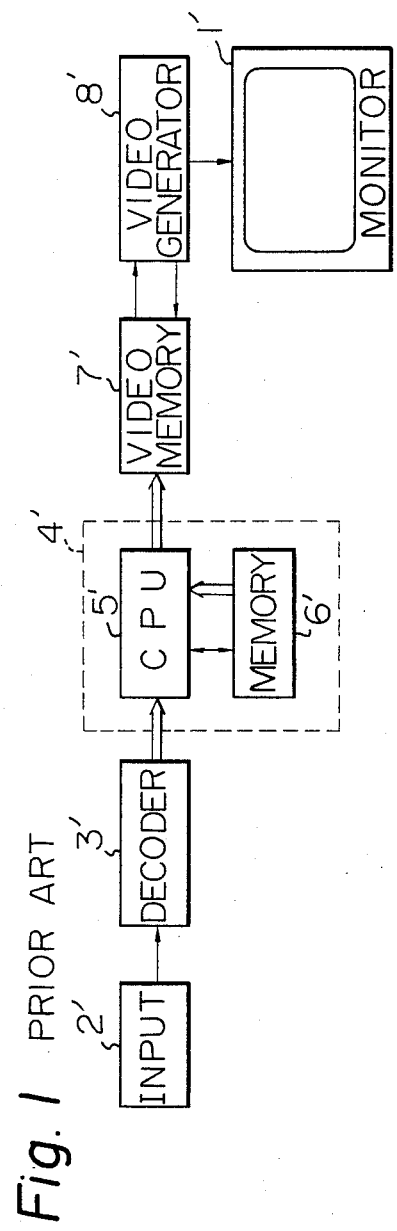
FIG. 1 is a block diagram of a type of a prior art picture information processing system.
Figure 2:
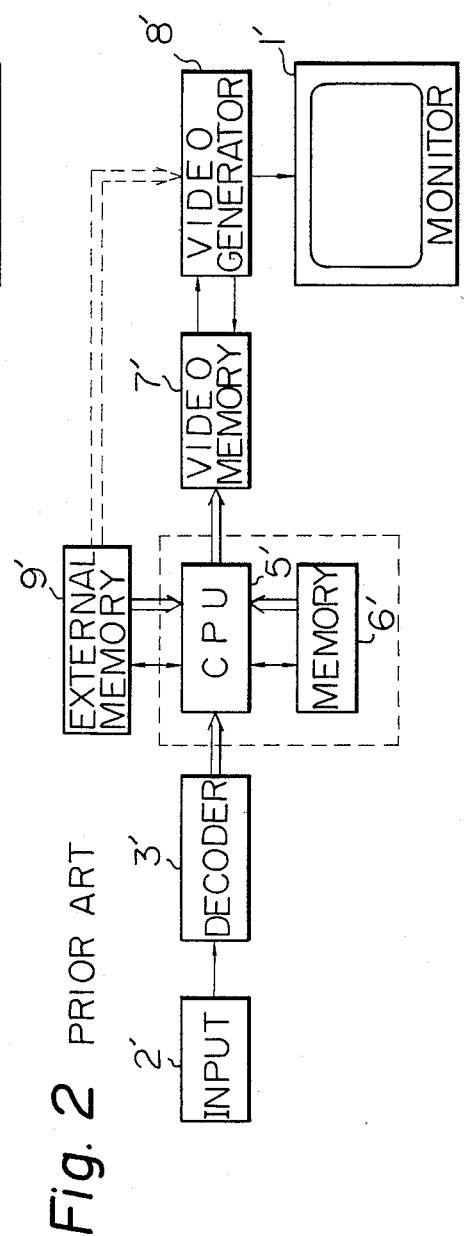
FIG. 2 is a block diagram of another type of prior art picture information processing system.

Before entering into the explanation of the preferred embodiment, reference is first made to FIGS. 1 and 2 in which prior art systems are depicted. FIG. 1 shows a first type of prior art picture information processing system such as a video game or an audio-visual education system. As shown, the system comprises an information input device 2' which may take the form of a switch or a potentiometer controllable by a manual operation of a player or a manipulator.

Generally, the player controls the input device 2' in accordance with his or her decision made in view of the picture displayed on the screen of a display device 1' which will be explained hereafter.

A decoder 3' is connected to the information input device 2', so that a game control signal from the information input device 2' is converted into a digital signal from which can be processed in a microprocessor system. An output signal of the decoder 3' is then applied to a control device 4' which may take the form of a microprocessor. The control device includes a central processing unit (CPU) 5' and a memory means 6' having a read only memory (ROM) used as a program memory and a random access memory (RAM). The CPU 5' executes a calculation for processing the information supplied from the decoder 3' in accordance with a program which is previously stored in the memory means 6'. A result of the calculation is then formed into a picture data for example, for displaying a stage of the game in the CPU 5'. The picture data is stored in a video memory 7' formed by a plurality of memory elements which are corresponding to picture elements of a display area of the display device 1. A video generator 8' is further provided to display the contents of the video memory 7' on the display device 1'. As previously mentioned, this type of system has a drawback of the limited memory space of the memory means 6', so that it cannot be operable with such a complicated program as to handle a relatively complicated pictures and to need a large capacity of memory.

FIG. 2 shows another type of the prior art picture information processing system which is disclosed for example, in Japanese Patent provisional publication No. 54-108748 (application No. 53-15235). In FIGS. 1 and 2, like reference numerals designate like elements. As shown, this system features an external memory device 9' which may take the form of a magnetic disc unit, a video tape recorder (VTR) or a video disc player (VDR). The external memory device 9' stores the so-called secondary picture information such as a picture of background or a message information. The secondary picture information is picture information which is not pressed in combination with game control signal and, namely, does not affect on the process of the game. In accordance with the command of the CPU 5', an appropriate one of the secondary picture information is selected and stored in the video memory 7' through the CPU 5'. The so-called primary picture information (which affects on the process of the game) produced in the CPU 5' in accordance with a signal from the decoder 3 is combined with the secondary picture information in the video memory 7'. Furthermore, the secondary picture information read out from the external memory device 9' may directly be supplied to the video generator 8' in which the secondary video information may directly be combined with the primary picture information from the CPU 5'. In that case, the synchronization of the first and second picture information is necessarily performed by a known art, for example, using a synchronizing signal generator which may preferably be provided in the video generator 8'. This type of system has an advantage that a program having increased steps can be stored in the memory means 6 because the memory means 6' is free from the secondary picture information. However, as previously mentioned, the more efficient use of the space of the program memory is intensively required, especially when relative complicated pictures should be realized on the display device 1' during game process in order to raise enthusiasm for the game.

Figure 3:
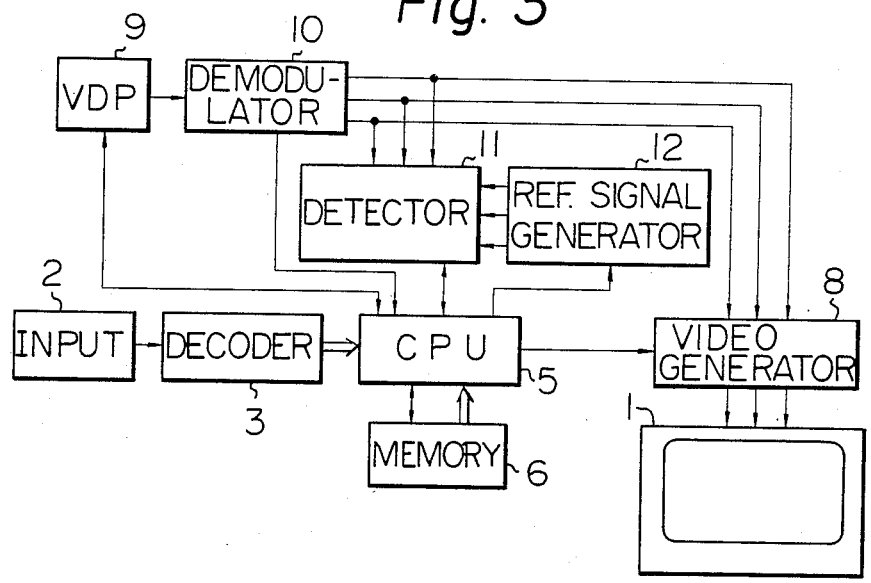
FIG. 3 is a block diagram of an embodiment of picture information processing system according to the present invention.

Referring to FIG. 3, the embodiment of the picture information processing system according to the present invention will be explained hereinafter. As shown, the system comprises an input device 2 which may take the form of a switch or a potentiometer operable by a player. A signal from the input device 2 is transformed into a digital data in a decoder 3 and supplied to a central processing unit (CPU) 5. The CPU 5 executes a program stored in a read only memory ROM 6 so as to produce a first picture information. A video disc player (VDP) 9, as an external memory device which stores an FM modulated color video signal, is provided to supply an output signal. i.e., a second picture information, in accordance with a control signal from the CPU 5. The output signal of the VDP 9 is supplied to a detector 11 and to a video generator 8 via a demodulator 10. The video generator 8 drive a displayer 1 such as a cathode ray tube which will be referred to as CRT hereinafter. Namely, the video generator 8 may apply saw-tooth wave signals to horizontal and vertical beam deflection coils of the CRT 1, while applying luminous and chrominance signals on the basis of the second picture information. The video generator 8 and the displayer constitutes display means. A timing signal from the CPU 5 and an output signal from a reference signal generator 12 are supplied to the detector 11. The demodulator 10 provides a synchronizing signal of the playback color video information to the CPU 5.

The operation of the system will now be explained. In the demodulator 10, the FM color video signal picked up from the video disc is treated by an FM demodulation process. The synchronizing signal is then picked up from the demodulation signal and decoded into an appropriate signal form to be supplied to the CPU 5. The synchronization between the VDR 9 and an output signal of the CPU 5 is performed in this way.

The color video signal is, in the demodulator 10, further separated into components signals of three primary colors red(R), green(G) and blue(B). The separated RGB components signal are then supplied to the video generator 8 in which the RGB components signals are processed so as to form a picture image on the display device 1. The RGB components signals may be respectively discrete signals each instantaneously having alternate one of two predetermined magnitudes for representing either presence or absence of a color to be displayed at a certain instance. Furthermore, the RGB components signals are supplied to the detector 11 wherein the detection of the hue of the picture at a timing determined by the CPU 5 is performed by comparing the RGB components signals with a reference signal supplied from a reference signal generator 12. In the video generator 8, the RGB components signals from the demodulator 10 and RGB components signals form the CPU 5 may be combined directly, i.e., the first and second picture information may be combined together.

Figure 4:
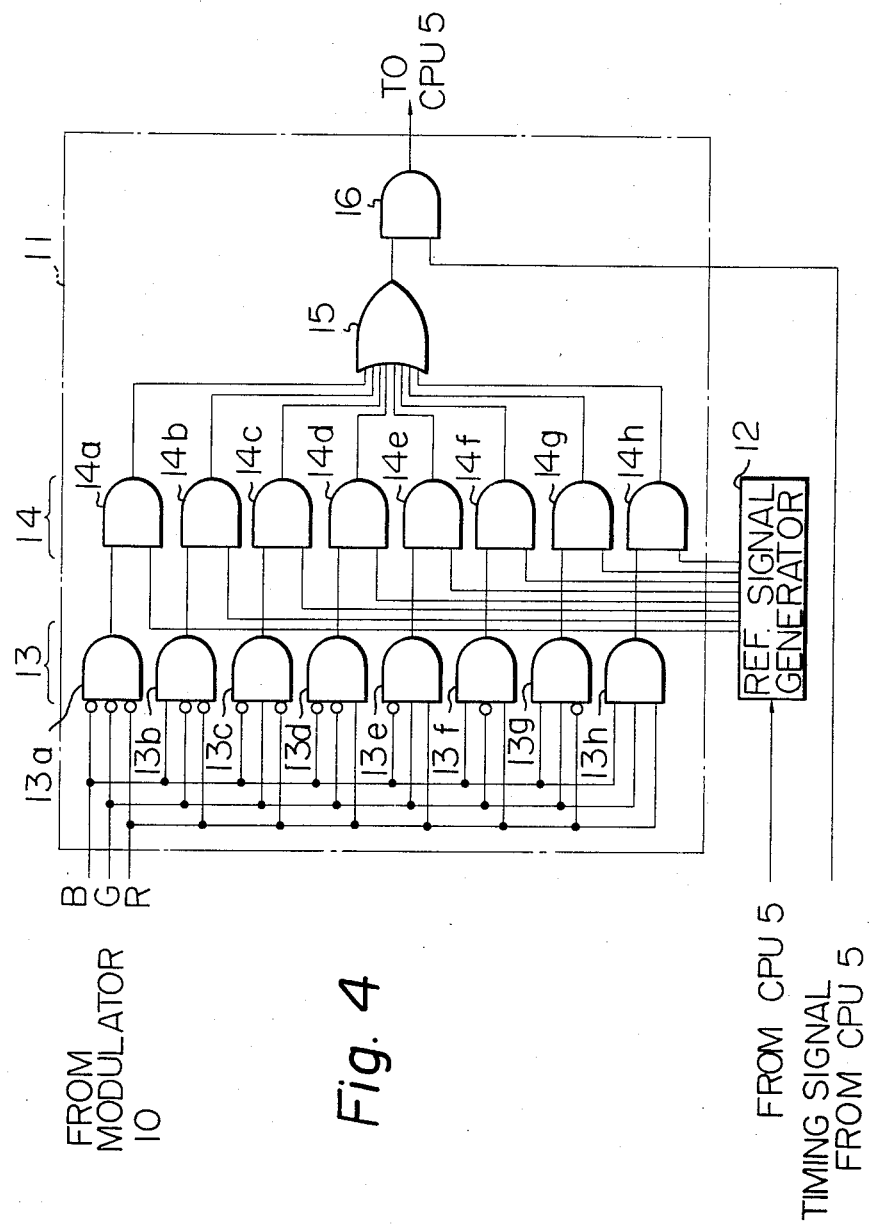
FIG. 4 is a circuit diagram of the detector of FIG. 3.

The arrangement of the detector 11 will be explined with reference to FIG. 4. As shown, the RGB components signals from the demodulator 10 are supplied to a first row of AND gates 13a through 13h. Inverters are provided at inputs of each AND gate 13a through 13g in a predetermined manner so that only one of the AND gates 13a through 13h produces logic "1" signal while the other AND gates produce logic "0" signal in accordance with each combination pattern of the RGB components signals. The relationship between the combination pattern of the RGB information signals and the output signals of the AND gates 13a through 13h are depicted in the truth table of FIG. 5. Output terminals of AND gates 13a through 13h are respectively connected to one of input terminals and AND gates 14a through 14h which form a second row of AND gate. The other input terminal of the AND gates 14a through 14h are connected to the reference signal generator 12 whose output signal pattern is determined by the CPU 5. Output terminals of AND gates 14a through 14h are connected to input terminals of an OR gate 15. An output terminal of the OR gate 15 is connected to an input terminal of an AND gate 16 which also receives a timing signal from the CPU 5. An output signal of the AND gate 16 is supplied to the CPU 5 as a command signal.

The operation of the detector 11 will be explained. If the picture information from the VDP 9 corresponds to the color red; the RGB information signal from the demodulator will have a pattern A shown in the truth table of FIG. 5. Therefore, the AND gate 13d of the first gate row 13 only produces the logic "1" signal while the other AND gates produce the logic "0" signal. Assuming that only one of the output signals of the reference signal generator 12, which is supplied to the AND gate 14d is the logic "1" in accordance with the control signal from the CPU 5. The AND gate 14d produces the logic "1" signal. If the output signals of the reference signal generator 12 are maintained in this state, the OR gate 15 produces the logic "1" signal each time when the VDP 9 produces the picture information of the color red. Thus, a detection of a preferred color information is performed. The output signal pattern of the reference signal generator 12 can be modified in accordance with the color which is to be detected. The AND gate 16 which receives the output signal of the OR gate 15 is also supplied with a logic "1" signal during when the timing signal lasts which is produced by the CPU 5 in accordance with a synchronizing signal supplied from the demodulator 10.

When the AND gate 16 produces the logic "1" command signal, the CPU 5 performs a predetermined operational process for modifying the first picture information.

Figure 6:
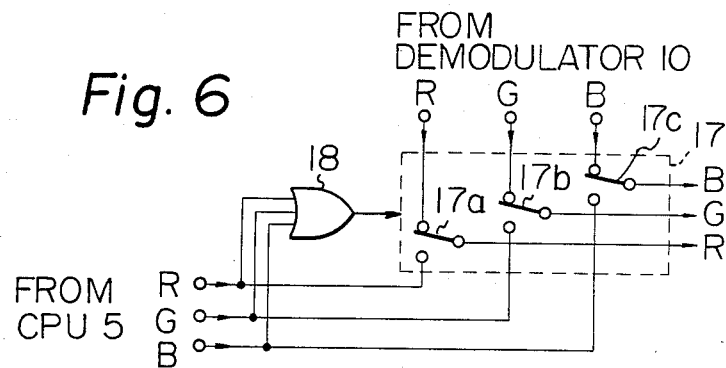
FIG. 6 is a circuit diagram of a portion of the video generator of FIG. 3.

As shown in FIG. 6, the output signals of the demodulator 10 and a picture information from the CPU 5 may be alternately supplied by means of a video switch 17 to the video generator 8 so as to display a combined picture. More specifically, each switch element 17a through 17c which are normally switched to the side of the RGB information signal from the demodulator 10, is automatically switched to the side of the RGB information from the CPU 5 during a period when the presence of the RGB information from the CPU 5 is detected by an OR gate 18.

In addition, if the reference signal generator 12 is arranged so that the logic "1" signal is in turn supplied to the input terminal of the AND gates 14a through 14h in accordance with a control signal from the CPU 5, a picture information of a color reproduced image at a given portion on the display screen can be detected by application of a timing signal to the AND gate 16, the timing signal lasting during a time period while the electron beams in the CRT impinges the given portion of the display screen.

Furthermore, a plurality of logic "1" signal may be supplied to the second row of AND gate 14 at the same time.

Referring to FIGS. 7 through 10, a game system according to the present invention will be explained. FIG. 7 shows a picture image displayed on the display device 1 by means of a picture information supplied from the VDR 9. A plurality of targets 19a through 19d which move at random as the time lapses, shown in the screen of the display device have respective colors which differ from each other and from the color of background plane. These targets move at random as the time goes by.

FIG. 8 shows a picture image displayed on the display device 1 by means of a picture information supplied from the CPU 5. The portion 20a indicates a score display portion and the portion 20b indicates a cursor portion which is movable in the screen in accordance with the signal applied from the input device 1. FIG. 9A shows a picture obtained by the combination of the picture information from the VDR 9 and the picture information from the CPU 5. The signal on a scanning line X is explained as an example. If the color of the target 19d is red, the RGB information signal from the demodulator 10 is as shown by FIGS. 9B through 9D. If the output signals of the reference signal generator 12 are set so that the red color is detected, the OR gate 15 produces a logic "1" signal at a timing shown by FIG. 9E, and applied the same to the AND gate 16.

The AND gate 16, on the other hand, recieves a timing signal shown in FIG. 9F in accordance with the position of the cursor 20b. In this state, however, the AND gate 16 does not produce the command signal because the position of the timing signal is different from the output signal of the OR gate 15 (see FIG. 9G).

FIG. 10A shows a similar picture image which is obtained by the combination of the picture inforamtion from the VDR 9 and the picture information from the CPU 5. In this case, the cursor portion 20b is located on the target 19c. In other words, the position of the timing signal (FIG. 10F) is equal to the signal from the OR gate 15, and a command signal (FIG. 10G) is produced by the AND gate 16. The command signal is then applied to the CPU 5 which, for example, performs such a predetermined operation as to raise the score displayed in the score display portion 20a. Needless to say, various modification of the calculation process in the CPU 5 is possible. As an example, the amount of the increase of the score can be varied depending on the types of the targets which may be colored differently from each other. Similarly, it can be arranged that the game comes to an end when the cursor 20b touches a target having a predetermined color.

The present invention has been described by way of example of the game system, however, present invention is applicable to another kind of systems such as an audio-vidual education system.

Figure 11:
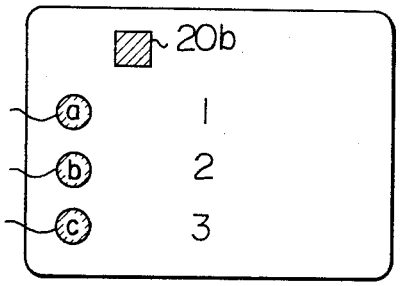
FIG. 11 is a picture illustrating another example of the image produced on the video screen using the both picture data from the external memory device and the microprocessor unit.

FIG. 11 shows, as an example, a picture image of a system described in Japanese patent provisional publication No. 54-157027 (application No. 53-65371). As shown, the answer of the operator can be entered by using positioning a cursor 20b on one of a set of targets 21a through 21c having colored differently from each other and corresponding to each alternative answer.

Furthermore, a picture information from the external memory device may have variation of brightness, luminosity or chroma. In that case, a signal obtained by the slice of the RGB information signal at a predetermined reference level can be utilized in the detector. Moreover, a black and white picture information can be utilized.

It will be appreciated from the foregoing, according to the present invention an advanced operation is enabled without increasing the program steps, by detecting a specific relationship between the picture information to be supplied direct to the displayer and the reference picture information which may be produced in various ways, thereby to produce the command signal, or a detection signal.

The detection signal is utilized not only for raising the score displayed in the score display but also for producing a kind of sound, such as, alarming sound and message voices. The detection signal may be used for finishing all the operation of the system or for cutting power supply from the system or for modifying the reproduced picture.

Therefore, the present invention has an advantage that a highly complicated and advanced operation can be performed since the above-mentioned detecting operation causes reduction of the number of steps by the program to be stored in program memory portion. Thus, the capacity of the program memory can be reduced and also the cycle period of the whole program can be reduced.

Furthermore, the picture information which is related to the processing of information such as a process of game can be changed simply by replacing a recording medium in the external memory device such as a video disc.

Moreover, since the detection of a specific condition of the picture information is performed by using the signal to be applied direct to the display device, the time lag between the detection operation and the display of the information altered thereafter can be eliminated. Therefore, an accurate processing of picture information is enabled.

Above, preferred embodiments of the present invention have been described. It should be understood, however, that the foregoing description is for illustrative purpose only, and is not intended to limit the scope of the invention. Rather there are numerous equivalents to the preferred embodiments, and such are intended to be covered by the appended claims.

What is claimed is:

1. A picture information processing system comprising:
    input means for generating a play control signal in accordance with external operations;
    memory means for storing picture information and for producing a picture information signal;
    display means for displaying a picture in accordance with said picture information signal;
    detecting means for producing a detection signal when said picture information signal has an instantaneous magnitude equal to or more than a predetermined value; and
    control means for performing a predetermined result operation in accordance with said play control signal and said detection signal, said control means adapted to produce an additional picture signal in accordance with said play control signal and said detection signal, said additional picture signal being constituted by three binary signals corresponding to primary colors, and said control means including a converting means for converting said picture information signal into three luminance components corresponding to said primary colors to be displayed by the display means, and a selecting means connected to said display means for normally selecting said three luminance components from said converting means and for selecting said three binary signals when at least one of said three binary signals is produced by said control means.

2. A picture information processing system according to claim 1, in which said memory means includes a recording medium carrying thereon a pattern representative of said picture information; and pick-up means for picking up said picture information from said pattern.

3. A picture information processing system according to claim 2, in which said recording medium is a memory disc, and said pick-up means is a disc player for playing said memory disc.

4. A picture information processing system according to claim 1, in which said display means includes a CRT, and a video generator adapted to control said CRT in accordance with said picture information signal.

5. A picture information processing system according to claim 1, in which said control means is adapted to produce a sound in accordance with said play control signal and said detection signal.

6. A picture information processing system according to claim 1, in which said picture information signal includes at least three color components, and said detecting means includes a first logic circuit for producing a variable logic signal on the bais of said color components, a reference signal generator for producing a reference logic signal of said predetermined value, and a comparing means for comparing said variable logic signal with said reference logic signal and for producing said detection signal when said variable logic signal coincides with said reference logic signal.

7. A picture information processing system according to claim 1, in which said three color components are red, green and blue components.

8. A picture information processing system according to claim 1, in which said instantaneous discrete magnitude is a predetermined voltage level.

9. A picture information process system according to claim 1, in which said selecting means comprises a logical OR gate having three input terminals provided with said three binary signals and producing an output signal when at least one of said input terminals is supplied with said binary signal, and a change-over switch means having two sets of input terminals provided with said three binary signals and said three luminance components, respectively, and controlled by the output signal of said logical OR gate so as to transmit said three binary signals upon presence of said output signal.

* * * * *